(12) United States Patent
Yoshida

(10) Patent No.: US 11,034,828 B2
(45) Date of Patent: Jun. 15, 2021

(54) LIQUID STABILIZER FOR SOFT VINYL CHLORIDE RESINS, SOFT VINYL CHLORIDE RESIN COMPOSITION USING SAID STABILIZER AND MOLDED BODY FORMED FROM SAID COMPOSITION

(71) Applicant: Sakai Chemical Industry Co., Ltd., Sakai (JP)

(72) Inventor: Yuji Yoshida, Tokyo (JP)

(73) Assignee: SAKAI CHEMICAL INDUSTRY CO., LTD., Osaka (JP)

( * ) Notice: Subject to any disclaimer, the term of this patent is extended or adjusted under 35 U.S.C. 154(b) by 76 days.

(21) Appl. No.: 16/087,293

(22) PCT Filed: Mar. 14, 2017

(86) PCT No.: PCT/JP2017/010102
§ 371 (c)(1),
(2) Date: Sep. 21, 2018

(87) PCT Pub. No.: WO2017/163998
PCT Pub. Date: Sep. 28, 2017

(65) Prior Publication Data
US 2019/0119482 A1    Apr. 25, 2019

(30) Foreign Application Priority Data

Mar. 22, 2016    (JP) .............................. JP2016-056781

(51) Int. Cl.

| | |
|---|---|
| *C08L 27/06* | (2006.01) |
| *B65D 65/02* | (2006.01) |
| *B65D 85/00* | (2006.01) |
| *C08G 65/26* | (2006.01) |
| *C08J 3/22* | (2006.01) |
| *C08K 5/098* | (2006.01) |
| *C08K 5/11* | (2006.01) |
| *C08K 5/09* | (2006.01) |
| *C08K 5/12* | (2006.01) |
| *C08J 5/18* | (2006.01) |
| *C08L 71/02* | (2006.01) |
| *B65D 85/50* | (2006.01) |
| *C08K 5/1515* | (2006.01) |
| *C08K 5/10* | (2006.01) |

(52) U.S. Cl.
CPC .............. *C08L 27/06* (2013.01); *B65D 65/02* (2013.01); *B65D 85/50* (2013.01); *B65D 85/70* (2013.01); *C08G 65/2609* (2013.01); *C08J 3/226* (2013.01); *C08J 5/18* (2013.01); *C08K 5/09* (2013.01); *C08K 5/098* (2013.01); *C08K 5/12* (2013.01); *C08L 71/02* (2013.01); *C08J 2327/06* (2013.01); *C08J 2471/02* (2013.01); *C08K 5/10* (2013.01); *C08K 5/11* (2013.01); *C08K 5/1515* (2013.01); *C08K 2201/014* (2013.01); *C08L 2201/08* (2013.01); *C08L 2205/06* (2013.01)

(58) Field of Classification Search
CPC ......... C08L 27/06; B65D 65/02; B65D 85/00; C08K 5/11; C08K 5/098; C08K 5/09; C08K 5/12; C08G 65/26; C08J 3/22; C08J 5/18
USPC ........................................................ 524/297
See application file for complete search history.

(56) References Cited

U.S. PATENT DOCUMENTS

| | | |
|---|---|---|
| 4,066,811 A | 1/1978 | Naito et al. |
| 5,175,322 A | 12/1992 | Yoshizawa et al. |
| 2014/0336321 A1 | 11/2014 | Yamasugi et al. |
| 2016/0160020 A1 * | 6/2016 | Matsuoka ............... C08L 27/06 525/190 |

FOREIGN PATENT DOCUMENTS

| | | | |
|---|---|---|---|
| CN | 104011131 A | 8/2014 | |
| JP | S50-136335 A | 10/1975 | |
| JP | S52-110187 A | 9/1977 | |
| JP | S54-023607 A | 2/1979 | |
| JP | S57-053598 A | 3/1982 | |
| JP | H04-359946 A | 12/1992 | |
| JP | H08-073397 A | 3/1996 | |
| JP | H09-111079 A | 4/1997 | |
| JP | 2668941 B2 | 7/1997 | |
| JP | 2002-020505 A | 1/2002 | |
| JP | 2004-155799 | * 6/2004 | |
| JP | 2007-204525 | * 8/2007 | |
| JP | 2007-204525 A | 8/2007 | |
| JP | 2010-100681 A | 5/2010 | |
| WO | WO-2015020105 A1 * | 2/2015 | .............. C08L 33/08 |

OTHER PUBLICATIONS

Richard J. Lewis, Sr., Hawley's Condensed Chemical Dictionary, 1997, Van Nostrand Reinhold, 13th Edition, pp. 888-889 (Year: 1997).*

International Search Report for International Application No. PCT/JP2017/010102, dated Apr. 11, 2017.

* cited by examiner

*Primary Examiner* — Deve V Hall
(74) *Attorney, Agent, or Firm* — Pearne & Gordon LLP

(57) ABSTRACT

There is provided a liquid stabilizer that can achieve a soft vinyl chloride resin composition having excellent blocking resistance and excellent transparency. A liquid stabilizer for a soft vinyl chloride resin according to the present invention includes: an organic acid zinc salt; an alkaline earth metal salt of an organic acid; and polypropylene glycol having a number-average molecular weight of 2,000 or more and/or ricinoleic acid.

22 Claims, No Drawings

LIQUID STABILIZER FOR SOFT VINYL CHLORIDE RESINS, SOFT VINYL CHLORIDE RESIN COMPOSITION USING SAID STABILIZER AND MOLDED BODY FORMED FROM SAID COMPOSITION

TECHNICAL FIELD

The present invention relates to a liquid stabilizer for a soft vinyl chloride resin, a soft vinyl chloride resin composition using the stabilizer, and a formed article formed from the composition.

BACKGROUND ART

A stretch film formed from a soft vinyl chloride resin composition has been used in the field of the food packaging of perishable foods, such as fruits and vegetables, fresh fish, and meat. Such stretch film, industrial sheet, or the like is typically wound in a roll shape. Accordingly, the operation of drawing (unrolling) the film and/or the sheet by a required length from a roll at the time of its use is needed, and hence blocking resistance (sometimes referred to as "opening property," "unrolling property," or "peelability") has been required. In particular, a stretch film for food packaging typically has a thickness of 0.1 mm or less, which is extremely small, and is hence liable to tear. Accordingly, when its blocking resistance is insufficient, it becomes difficult to put the film into practical use. A vinyl chloride resin composition in which components and their compounding amounts are specified in detail has been proposed as a technology for an improvement in blocking resistance of a stretch film (Patent Literature 1). However, the composition described in Patent Literature 1 is not practical because the composition can exhibit effects only in extremely limited ranges of the components and the compounding amounts, and hence its composition ratio cannot be changed and/or adjusted in accordance with the size of a forming machine or a film processing temperature. For example, when a forming machine is small, the time period for which the resin composition stays in the forming machine is short, and hence heat resistance and lubricity are not needed to a very large extent. However, as the forming machine becomes larger, the staying time lengthens, and hence a component composition ratio in a stabilizer needs to be changed or adjusted. In addition, inorganic particles, such as silica fine particles, or additives, such as ethylene bisamide, are typically added for improving the blocking resistance of a film or a sheet. However, when those particles or additives are added to such an extent that practical blocking resistance is expressed, there is a problem in that the transparency of the film and/or the sheet reduces.

CITATION LIST

Patent Literature

[PTL 1] JP 2010-100681 A

SUMMARY OF INVENTION

Technical Problem

The present invention has been made to solve the problems, and an object of the present invention is to provide a liquid stabilizer that can achieve a soft vinyl chloride resin composition having excellent blocking resistance and excellent transparency.

Solution to Problem

A liquid stabilizer for a soft vinyl chloride resin according to an embodiment of the present invention includes: an organic acid zinc salt; an alkaline earth metal salt of an organic acid; and polypropylene glycol having a number-average molecular weight of 2,000 or more and/or ricinoleic acid.

In one embodiment of the present invention, the liquid stabilizer includes two or more kinds of the organic acid zinc salts.

In one embodiment of the present invention, the liquid stabilizer includes two or more kinds of the alkaline earth metal salts of the organic acid.

In one embodiment of the present invention, the organic acid is selected from oleic acid, octylic acid, and benzoic acid.

In one embodiment of the present invention, the alkaline earth metal is selected from calcium and barium.

According to another aspect of the present invention, there is provided a soft vinyl chloride resin composition. The composition includes, with respect to 100 parts by weight of a vinyl chloride resin, 0.1 part by weight to 5 parts by weight of the liquid stabilizer as described above; and 20 parts by weight to 100 parts by weight of a plasticizer.

In one embodiment of the present invention, the plasticizer is selected from an alkyl adipate, an epoxidized soybean oil, and a phthalate.

According to still another aspect of the present invention, there is provided a formed article, which is formed from the soft vinyl chloride resin composition as described above.

In one embodiment of the present invention, the formed article includes a film or a sheet. In one embodiment of the present invention, the formed article is for use in food packaging.

Advantageous Effects of Invention

According to the present invention, the liquid stabilizer that can achieve a soft vinyl chloride resin composition having excellent blocking resistance and excellent transparency can be achieved by using the polypropylene glycol having a molecular weight of a predetermined value or more and/or ricinoleic acid. It has heretofore been considered that the polypropylene glycol and ricinoleic acid each have only efficacy as part of components dissolved in the liquid stabilizer or a weak lubricant. However, such excellent effect as described above was actually obtained. The fact is a finding that was obtained only after the polypropylene glycol and/or ricinoleic acid was used in combination with a specific component in the present invention, and is an unexpected and excellent effect. Further, the polypropylene glycol having a molecular weight of a predetermined value or more and/or ricinoleic acid expresses excellent blocking resistance but does not inhibit any other performance. Accordingly, the following industrially extremely excellent effect can be achieved: a composition ratio between the components of the liquid stabilizer can be changed and adjusted in accordance with the size of a forming machine and a processing temperature.

DESCRIPTION OF EMBODIMENTS

Hereinafter, embodiments of the present invention are described. However, the present invention is not limited to these embodiments.

A. Liquid Stabilizer for Soft Vinyl Chloride Resin

A liquid stabilizer for a soft vinyl chloride resin according to an embodiment of the present invention includes: an organic acid zinc salt; an alkaline earth metal salt of an organic acid; and polypropylene glycol having a number-average molecular weight of 2,000 or more and/or ricinoleic acid.

The organic acid zinc salt is typically obtained by causing an organic acid and zinc oxide to react with each other. In one embodiment, the organic acid zinc salt is an organic acid normal salt obtained by causing 1 equivalent of zinc oxide to react with 2 equivalents of the organic acid.

The organic acid is typically a carboxylic acid. Examples of the carboxylic acid include a saturated fatty acid, an unsaturated fatty acid, and a carbocyclic carboxylic acid each having 2 to 22 carbon atoms. Specific examples of those carboxylic acids include acetic acid, propionic acid, valeric acid, caproic acid, octylic acid, 2-ethylhexylic acid, tridecanoic acid, isodecanoic acid, neodecanoic acid, undecanoic acid, lauric acid, myristic acid, palmitic acid, stearic acid, isostearic acid, 12-hydroxystearic acid, oleic acid, linoleic acid, ricinoleic acid, erucic acid, behenic acid, thioglycolic acid, mercaptopropionic acid, laurylmercaptopropionic acid, benzoic acid, para-t-butylbenzoic acid, 3-methylbenzoic acid, dimethylbenzoic acid, aminobenzoic acid, salicylic acid, aminoacetic acid, glutamic acid, oxalic acid, glutaric acid, succinic acid, malonic acid, adipic acid, phthalic acid, fumaric acid, maleic acid, malic acid, citric acid, tartaric acid, thiodipropionic acid, trimellitic acid, pyromellitic acid, and mellitic acid. Of those, oleic acid, octylic acid, benzoic acid, para-t-butylbenzoic acid, 3-methylbenzoic acid, 2-ethylhexylic acid, neodecanoic acid, maleic acid, and trimellitic acid are preferred, and oleic acid, octylic acid, 2-ethylhexylic acid, benzoic acid, para-t-butylbenzoic acid, and 3-methylbenzoic acid are more preferred.

Only one kind of organic acid zinc salt may be incorporated into the liquid stabilizer, or two or more kinds thereof may be incorporated thereinto.

The content of the organic acid zinc salt in the liquid stabilizer is preferably from 5 wt % to 40 wt %, more preferably from 5 wt % to 20 wt % with respect to the total amount of the liquid stabilizer. When the content of the organic acid zinc salt falls within such range, the following advantage is obtained: coloring at the time of the production and/or processing of a formed article is reduced.

The alkaline earth metal salt of the organic acid is typically obtained by causing the organic acid and an alkaline earth metal-containing substance to react with each other. Examples of the alkaline earth metal include calcium (Ca), magnesium (Mg), strontium (Sr), and barium (Ba). Of those, calcium and barium are preferred. Examples of the alkaline earth metal-containing substance include calcium hydroxide, barium hydroxide, and magnesium oxide. Examples of the organic acid are as described above. Preferred examples of the organic acid include oleic acid, benzoic acid, and para-t-butylbenzoic acid.

Only one kind of alkaline earth metal salt of the organic acid may be incorporated into the liquid stabilizer, or two or more kinds thereof may be incorporated thereinto.

The content of the alkaline earth metal salt of the organic acid in the liquid stabilizer is preferably from 5 wt % to 70 wt %, more preferably from 5 wt % to 50 wt % with respect to the total amount of the liquid stabilizer. When the content of the alkaline earth metal salt falls within such range, the following advantage is obtained: seizure at the time of the production of a formed article is reduced, and hence the long-run property at the time of forming the formed article is improved.

The polypropylene glycol is used as an anti blocking agent. The polypropylene glycol can express its effect when its number-average molecular weight is 1,000 or more. In the embodiment of the present invention, the number-average molecular weight of the polypropylene glycol is preferably 2,000 or more, more preferably from 3,000 to 5,000. When the number-average molecular weight of the polypropylene glycol falls within such range, an adhesive strength in the case where a part of a film and/or a sheet overlaps another part thereof (e.g., the film and/or the sheet is wound in a roll shape) can be made appropriate without any reduction in transparency of the film and/or the sheet, and hence satisfactory blocking resistance can be achieved. The number-average molecular weight is determined by, for example, gel permeation chromatography (GPC).

As in the polypropylene glycol, ricinoleic acid is used as an anti blocking agent. When ricinoleic acid is used not as an organic acid forming a zinc salt or an alkaline earth metal salt but as an anti blocking agent, an adhesive strength in the case where a part of a film and/or a sheet overlaps another part thereof (e.g., the film and/or the sheet is wound in a roll shape) can be made appropriate without any reduction in transparency of the film and/or the sheet, and hence satisfactory blocking resistance can be achieved. Further, ricinoleic acid also has a function as a lubricant, and hence has an advantage in that there is no need to add an extra lubricant component.

Each of the polypropylene glycol and ricinoleic acid may be incorporated alone into the liquid stabilizer, or both thereof may be incorporated into the liquid stabilizer.

The content of the polypropylene glycol and/or ricinoleic acid in the liquid stabilizer is preferably from 3 wt % to 40 wt %, more preferably from 10 wt % to 30 wt % with respect to the total amount of the liquid stabilizer. When the content of the polypropylene glycol and/or ricinoleic acid falls within such range, even in consideration of the thickness of a film or a sheet to be obtained or the influences of various additives in a vinyl chloride resin composition, an adhesive strength in the case where a part of the film and/or the sheet overlaps another part thereof (e.g., the film and/or the sheet is wound in a roll shape) can be made appropriate without any reduction in transparency of the film and/or the sheet, and hence satisfactory blocking resistance can be achieved.

The liquid stabilizer may be prepared by any appropriate method. For example, the organic acid zinc salt, the alkaline earth metal salt of the organic acid, the polypropylene glycol and/or ricinoleic acid, and as required, any appropriate other component may be collectively mixed, or these materials may be added in any order. In addition, with regard to the organic acid zinc salt and/or the alkaline earth metal salt of the organic acid, a product obtained by causing the organic acid, and zinc and/or an alkaline earth metal to react with each other in advance may be mixed with the polypropylene glycol and/or ricinoleic acid, and as required, the other component, or the polypropylene glycol and/or ricinoleic acid, and as required, the other component may be added to the reaction system of the organic acid, and zinc and/or the alkaline earth metal.

B. Soft Vinyl Chloride Resin Composition

A soft vinyl chloride resin composition according to an embodiment of the present invention contains a vinyl chloride resin, the liquid stabilizer described in the section A, and a plasticizer.

The term "vinyl chloride resin" as used herein is used in meaning including not only polyvinyl chloride but also a vinyl chloride-based resin. Examples of the vinyl chloride-based resin include pentachlorinated polyvinyl chloride, a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-maleic anhydride terpolymer, a vinyl chloride-alkyl, cycloalkyl, or aryl maleimide copolymer, a vinyl chloride-styrene-acrylonitrile copolymer, a vinyl chloride-butadiene copolymer, a vinyl chloride-isoprene copolymer, a vinyl chloride-chlorinated propylene copolymer, a vinyl chloride-vinylidene chloride-vinyl acetate terpolymer, a vinyl chloride-acrylic acid ester copolymer, a vinyl chloride-maleic acid ester copolymer, a vinyl chloride-methacrylic acid ester copolymer, a vinyl chloride-acrylonitrile copolymer, and a vinyl chloride-urethane copolymer. Those vinyl chloride-based resins may be used alone or in combination thereof.

The polymerization degree of the vinyl chloride resin is preferably from 1,000 to 2,000. When the polymerization degree of the vinyl chloride resin falls within such range, the composition is excellent in forming property into a film and a sheet, and a film and a sheet each excellent in balance between its strength and touch feeling are obtained.

Typical examples of the plasticizer include an alkyl adipate, an epoxidized soybean oil, and an alkyl phthalate. Those plasticizers may be used alone or in combination thereof. Specific examples of the alkyl adipate include diisononyl adipate and dioctyl adipate. Specific examples of the alkyl phthalate include dioctyl phthalate, diisononyl phthalate, diisodecyl phthalate, and dibutyl phthalate. The epoxidized soybean oil has an effect as a heat-resistant aid in addition to an effect as a plasticizer, and hence the combined use of the epoxidized soybean oil and any other plasticizer can further improve the heat resistance of the composition.

The soft vinyl chloride resin composition contains 0.1 part by weight to 5 parts by weight, preferably 0.5 part by weight to 2 parts by weight of the liquid stabilizer with respect to 100 parts by weight of the vinyl chloride resin. When the content of the liquid stabilizer falls within such range, excellent blocking resistance and excellent thermal stability can be achieved. In addition, the soft vinyl chloride resin composition contains 20 parts by weight to 100 parts by weight, preferably 40 parts by weight to 70 parts by weight of the plasticizer with respect to 100 parts by weight of the vinyl chloride resin. When the content of the plasticizer falls within such range, in the case where a stretch film for food packaging is formed from the composition, a desired self-pressure-sensitive adhesive property can be imparted thereto. As a result, the following effects are obtained: an object to be packaged can be securely packaged without the tearing of the film; and the film packaging the object does not peel with time.

The soft vinyl chloride resin composition may further contain any appropriate additive. Specific examples of the additive include a β-diketone compound or a metal salt thereof, an epoxy compound, a filler, a pigment, a dye, a cross-linking agent (or a reinforcing agent), an antistatic agent, an anti-plate out agent, a surface treatment agent, a lubricant, a flame retardant, a fluorescent agent, a fungicide, a bactericide, an antibacterial agent, a metal deactivator, a mold release agent, a processing aid, an antioxidant, a light stabilizer, and a blowing agent. The number, kinds, combination, compounding amounts, and the like of the additives may be appropriately set in accordance with purposes. When the soft vinyl chloride resin composition is used in the field of food packaging, an additive conforming to the "Voluntary Standards on Food Hygiene of PVC Resin Products" of Japan Hygienic PVC Association is preferably used.

Examples of the β-diketone compound include dibenzoylmethane, stearoylbenzoylmethane, palmitoylbenzoylmethane, benzoylacetone, and acetylacetone. Examples of the metal salt thereof include metal salts, such as a zinc salt, a calcium salt, a magnesium salt, and an aluminum salt, of those compounds.

Examples of the epoxy compound include: an epoxy compound of an animal or vegetable unsaturated oil and fat, such as an epoxidized soybean oil or an epoxidized linseed oil; an epoxy compound of an unsaturated fatty acid ester; an aromatic glycidyl ether and an aliphatic glycidyl ether; and an epoxy compound of a saturated alicyclic compound.

Examples of the filler include precipitated calcium carbonate, ground calcium carbonate, clay, talc, silica, diatomaceous earth, pumice powder, mica powder, alumina, aluminum sulfate, barium sulfate, glass fibers, carbon fibers, graphite, and wood powder.

Examples of the pigment include an inorganic pigment and an organic pigment. Examples of the inorganic pigment include titanium oxide, barium sulfate, calcium carbonate, zinc oxide, lead sulfate, chrome yellow, zinc yellow, colcothar (red iron(III) oxide), cadmium red, ultramarine blue, Prussian blue, chromium oxide green, cobalt green, umber, titanium black, synthetic iron black, carbon black, mica, aluminum oxide coated with titanium oxide or iron oxide, mica coated with titanium oxide or iron oxide, glass flakes, and a hologram pigment. Other than the above, there are given: as metal powder pigments, aluminum powder, copper powder, stainless-steel powder, and a metal colloid; and as pigments each having an interferential action, transparent pearl mica, colored mica, interference mica, interference alumina, and interference silica (interference glass). Examples of the organic pigment include: azo-based pigments (such as monoazo yellow, condensed azo yellow, and azomethine yellow); yellow pigments, such as yellow iron oxide, titanium yellow, bismuth vanadate, benzimidazolone, isoindolinone, isoindoline, quinophthalone, benzidine yellow, and permanent yellow; orange pigments, such as permanent orange; red pigments, such as red iron oxide, naphthol AS-based azo red, anthanthrone, anthraquinonyl red, perylene maroon, quinacridone red, diketo pyrrolo pyrrole red, and permanent red; violet pigments, such as cobalt violet, quinacridone violet, and dioxazine violet; blue pigments, such as cobalt blue, a phthalocyanine-based pigment (such as phthalocyanine blue), and threne blue; green pigments, such as phthalocyanine green; and organic dyes, such as an azo-based disperse dye and an anthraquinone-based disperse dye.

Examples of the dye include an azo dye, an anthraquinone dye, an indigoid dye, a sulfide dye, a triphenylmethane dye, a pyrazolone dye, a stilbene dye, a diphenylmethane dye, a xanthene dye, an alizarin dye, an acridine dye, a quinonimine dye (an azine dye, an oxazine dye, and a thiazine dye), a thiazole dye, a methine dye, a nitro dye, and a nitroso dye.

Examples of the cross-linking agent include an acrylonitrile-butadiene-styrene resin, a methyl methacrylate-butadiene-styrene resin, an acrylic resin, a butadiene resin, a vinyl acetate-ethylene copolymer, an ethylene-α-olefin copolymer, and chlorinated polyethylene.

The processing aid is, for example, a copolymer formed of 50 mass % to 100 mass % of methyl methacrylate and 0 mass % to 50 mass % of one or more kinds of vinyl monomers copolymerizable therewith. Examples of the vinyl monomers copolymerizable with methyl methacrylate to be used include an aromatic vinyl monomer, a vinyl cyanide monomer, an alkyl methacrylate other than methyl methacrylate, and an alkyl acrylate. Specific examples of the aromatic vinyl monomer include styrene, an α-substituted styrene, and a nucleus-substituted styrene, and derivatives thereof (e.g., α-methylstyrene, chlorostyrene, and vinyltoluene). Specific examples of the vinyl cyanide monomer include acrylonitrile and methacrylonitrile. Specific examples of the alkyl methacrylate other than methyl methacrylate include ethyl methacrylate, propyl methacrylate, and butyl methacrylate, and commercial products thereof include products bearing the product name "KANE ACE SERIES" of Kaneka Corporation and the product name "METABLEN SERIES" of Mitsubishi Rayon Co., Ltd.

Examples of the antioxidant include a hindered phenol-based compound, a phosphite-based compound, a phosphonite-based compound, and a thioether-based compound.

Examples of the hindered phenol-based compound include α-tocopherol, butylhydroxytoluene, sinapyl alcohol, vitamin E, n-octadecyl-β-(4'-hydroxy-3',5'-di-tert-butylphenyl)propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylene-bis(4-methyl-6-tert-butylphenol), 2,2'-methylene-bis(4-ethyl-6-tert-butylphenol), 4,4'-methylene-bis(2,6-di-tert-butylphenol), 2,2'-methylene-bis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl)propionate, 1,6-hexanediol-bis[3-(3,5-di-tert-butyl-4-hydroxyphenyl)propionate], bis[2-tert-butyl-4-methyl-6-(3-tert-butyl-5-methyl-2-hydroxybenzyl)phenyl]terephthalate, 3,9-bis{2-[3-(3-tert-butyl-4-hydroxy-5-methylphenyl)propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2'-thiodiethylene-bis-[3-(3,5-di-tert-butyl-4-hydroxyphenyl)propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxyphenyl)isocyanurate, tris(3,5-di-tert-butyl-4-hydroxybenzyl)isocyanurate, 1,3,5-tris(4-tert-butyl-3-hydroxy-2,6-dimethylbenzyl)isocyanurate, 1,3,5-tris-2-[3(3,5-di-tert-butyl-4-hydroxyphenyl)propionyloxy]ethyl isocyanurate, and tetrakis[methylene-3-(3',5'-di-tert-butyl-4-hydroxyphenyl)propionate]methane.

Examples of the phosphite-based compound include triphenyl phosphite, tris(nonylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis{2,4-bis(1-methyl-1-phenylethyl)phenyl}pentaerythritol diphosphite, phenyl bisphenol A pentaerythritol diphosphite, bis(nonylphenyl)pentaerythritol diphosphite, and dicyclohexyl pentaerythritol diphosphite. Other examples of the phosphite-based compound include compounds each of which reacts with a dihydric phenol and has a cyclic structure.

Examples of the phosphonite-based compound include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite, and bis(2,6-di-tert-butylphenyl)-3-phenyl-phenyl phosphonite.

Examples of the thioether-based compound include dilauryl thiodipropionate, ditridecyl thiodipropionate, dimyristyl thiodipropionate, distearyl thiodipropionate, pentaerythritol-tetrakis(3-laurylthiopropionate), pentaerythritol-tetrakis(3-dodecylthiopropionate), pentaerythritol-tetrakis(3-octadecyithiopropionate), pentaerythritol-tetrakis(3-myristylthiopropionate), and pentaerythritol-tetrakis(3-stearylthiopropionate).

Examples of the light stabilizer, which includes an UV absorber, include a benzophenone-based compound, a benzotriazole-based compound, an aromatic benzoate-based compound, an oxanilide-based compound, a cyanoacrylate-based compound, and a hindered amine-based compound.

Examples of the benzophenone-based compound include benzophenone, 2,4-dihydroxybenzophenone, 2,2'-dihydroxybenzophenone, 2,2',4,4'-tetrahydroxybenzophenone, 2-hydroxy-4-methoxybenzophenone, 2,2'-dihydroxy-4,4'-dimethoxybenzophenone, 2,2'-dihydroxy-4,4'-dimethoxy-5-sulfobenzophenone, 2-hydroxy-4-octoxybenzophenone, 2-hydroxy-4-dodecyloxybenzophenone, 2-hydroxy-4-methoxy-5-sulfobenzophenone, 5-chloro-2-hydroxybenzophenone, 2-hydroxy-4-octoxybenzophenone, 2-hydroxy-4-methoxy-2'-carboxybenzophenone, and 2-hydroxy-4-(2-hydroxy-3-methyl-acryloxyisopropoxy)benzophenon e.

Examples of the benzotriazole-based compound include 2-(5-methyl-2-hydroxyphenyl)benzotriazole, 2-(3,5-di-tert-butyl-2-hydroxyphenyl)benzotriazole, 2-(3,5-di-tert-amyl-2-hydroxyphenyl)benzotriazole, 2-(3',5'-di-tert-butyl-4'-methyl-2'-hydroxyphenyl)benzotriazol e, 2-(3,5-di-tert-amyl-2-hydroxyphenyl)-5-chlorobenzotriazole, 2-(5-tert-butyl-2-hydroxyphenyl)benzotriazole, 2-[2'-hydroxy-3',5'-bis(α,α-dimethylbenzyl)phenyl]benzotriazol e, 2-[2'-hydroxy-3',5'-bis(α,α-dimethylbenzyl)phenyl]-2H-benzotriazole, and 2-(4'-octoxy-2'-hydroxyphenyl)benzotriazole.

Examples of the aromatic benzoate-based compound include alkylphenyl salicylates, such as p-tert-butylphenyl salicylate and p-octylphenyl salicylate.

Examples of the oxanilide-based compound include 2-ethoxy-2'-ethyloxalic acid bisanilide, 2-ethoxy-5-tert-butyl-2'-ethyloxalic acid bisanilide, and 2-ethoxy-3'-dodecyloxalic acid bisanilide.

Examples of the cyanoacrylate-based compound include ethyl-2-cyano-3,3'-diphenylacrylate, and 2-ethylhexyl-cyano-3,3'-diphenylacrylate.

Examples of the hindered amine-based compound include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-octadecyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)carbonate, bis(2,2,6,6-tetramethyl-4-piperidyl)oxalate, bis(2,2,6,6-tetramethyl-4-piperidyl)malonate, bis(2,2,6,6-tetramethyl-4-piperidyl)sebacate, bis(2,2,6,6-tetramethyl-4-piperidyl)adipate, bis(2,2,6,6-tetramethyl-4-piperidyl)terephthalate, 1,2-bis(2,2,6,6-tetramethyl-4-piperidyloxy)-ethane, α,α-bis(2,2,6,6-tetramethyl-4-piperidyloxy)-p-xylene, bis(2,2,6,6-tetramethyl-4-piperidyl)-tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxy late, tris(2,2,6,6-tetramethyl-4-piperidyl)-benzene-1,3,4-tricarboxy late, 1-2-{3-(3,5-di-tert-butyl-4-hydroxyphenyl) propionyloxy}-2,2,6,6-tetramethylpiperidine, and a condensate of 1,2,3,4-butanetetracarboxylic acid, 1,2,2,6,6-pentamethyl-4-piperidinol, and β,β,β',β'-tetramethyl-3,9-[2,4,8,10-tetraoxaspiro(5,5)undecane]dimethanol.

Examples of the antistatic agent include: inorganic antistatic agents including: carbon powder, such as carbon black and graphite; a tin-antimony composite oxide; an antimony-indium-tin composite oxide; an indium-tin composite oxide; metal oxides, such as conductive indium oxide, tin oxide, and zinc oxide, each doped with Sn, F, Cl, or the like; various metal particles (powder), such as copper, nickel, silver, gold, and aluminum; and metal fibers; and organic antistatic agents including: a polyglycerin fatty acid ester; a quaternary ammonium salt-based compound and a sulfonic acid salt-based compound, such as (β-lauramidopropionyl)trimethylammonium sulfate and sodium dodecylbenzenesulfonate; and an alkylphosphate-based compound.

Examples of the flame retardant include a bromine-based flame retardant, a phosphorus-based flame retardant, a chlorine-based flame retardant, a triazine-based flame retardant, and a salt of phosphoric acid and piperazine, and as well, an inorganic flame retardant.

Examples of the bromine-based flame retardant include compounds including brominated polystyrene, brominated polyacrylate, a brominated polyphenylene ether, a brominated bisphenol A epoxy resin, a modified product of a brominated bisphenol A epoxy resin in which part or the whole of glycidyl groups at terminals of a molecular chain thereof is blocked, a polycarbonate oligomer synthesized using brominated bisphenol A as a raw material, a brominated diphthalimide compound, a brominated biphenyl ether, and a brominated diphenyl alkane compound, such as 1,2-di(pentabromophenyl) ethane. Of those, brominated polystyrene, such as polytribromostyrene, poly(dibromophenylene oxide), decabromodiphenyl ether, bis(tribromophenoxy)ethane, 1,2-di(pentabromophenyl)ethane, ethylene-bis-(tetrabromophthalimide), tetrabromobisphenol A, a brominated polycarbonate oligomer, brominated polystyrene, such as polytribromostyrene, and 1,2-di(pentabromophenyl)ethane are preferred.

Examples of the phosphorus-based flame retardant include: phosphoric acid esters, such as trimethyl phosphate, triethyl phosphate, tributyl phosphate, tri(2-ethylhexyl) phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyl diphenyl phosphate, xylenyl diphenyl phosphate, diphenyl(2-ethylhexyl) phosphate, di(isopropylphenyl)phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, melamine pyrophosphate, triphenylphosphine oxide, tricresylphosphine oxide, diphenyl methanephosphonate, and diethyl phenylphosphonate; and condensed phosphoric acid esters including aromatic condensed phosphoric acid esters, such as resorcinol polyphenyl phosphate, 1,3-phenylenebis(2,6-dimethylphenyl phosphate), resorcinol poly(di-2,6-xylyl) phosphate, bisphenol A polycresyl phosphate, bisphenol A polyphenyl phosphate, hydroquinone poly(2,6-xylyl) phosphate, and a condensate thereof.

Examples of the chlorine-based flame retardant include pentachloropentacyclodecane, hexachlorobenzene, pentachlorotoluene, tetrachlorobisphenol A, and polychlorostyrene.

Examples of the triazine-based flame retardant include melamine, acetoguanamine, benzoguanamine, acrylic guanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, and 2-amino-4,6-dimercapto-1,3,5-triazine.

Examples of the salt of phosphoric acid and piperazine include piperazine orthophosphate, piperazine pyrophosphate, and piperazine polyphosphate.

Examples of the inorganic flame retardant include antimony compounds, such as antimony trioxide and antimony pentachloride, zinc borate, sodium borate, aluminum hydroxide, magnesium hydroxide, and red phosphorus.

The fungicide is, for example, a fungicide obtained by causing zeolite, apatite, or the like to carry an inorganic metal ion, such as a silver, copper, or zinc ion. As an organic fungicide, there are given: a haloalkylthio compound typified by N-(fluorodichloromethylthio)-phthalimide; an organic arsenic-based compound typified by 10,10-oxybisphenoxyarsine; an organic iodo compound typified by 3-iodo-2-propylbutylthiocarbamate; abenzimidazole-based compound typified by 2-(4-thiazolyl)-benzimidazole; an isothiazoline-based compound typified by 2-n-octyl-4-isothiazolyl-3-one; a pyrithione-based compound typified by 2-pyridinethiol-1-oxide sodium salt; a nitrile compound typified by 2,4,5,6-tetrachloroisophthalonitrile; a pyridine-based compound typified by 2,3,5,6-tetrachloro-4-(methylsulfonyl)pyridine; a triazine-based compound typified by N,N',N''-trishydroxyethylhexahydro-S-triazine; bis(pyridine-2-thiol-1-oxide) zinc salt; and a mixture of N-(fluorodichloromethylthio)phthalimide and a liquid nitrogen-containing heterocyclic amide compound.

Examples of the bactericide include: copper bactericides, such as oxine copper; organic sulfur bactericides, such as zineb and maneb; organic chlorine-based bactericides, such as captan and chlorothalonil; benzimidazole-based bactericides, such as thiophanate methyl, benomyl, carbendazole, and thiabendazole; dicarboxyimide-based bactericides, such as iprodione, vinclozolin, and procymidone; acid amide-based bactericides, such as furametpyr; phenylpyrrole-based bactericides, such as fludioxonil; morpholine-based bactericides, such as dimethomorph; methoxyacrylate-based bactericides, such as azoxystrobin, kresoxim methyl, and oribright; anilinopyrimidine-based bactericides, such as mepanipyrim, cyprodinil, and pyrimethanil; ergosterol biosynthesis inhibitors, such as triadimefon and triflumizol; and soil bactericides, such as chloropicrin and PCNB; and as well, fluazinam, o-phenylphenol (OPP), diphenyl, chlorodiphenyl, cresol, 1,2-bis(bromoacetoxy)ethane, cinnamaldehyde, phenyl acetate, allyl isothiocyanate, α-methyl acetophenone, thymol, perchlorocyclopentadiene, bromoacetic acid, 2,2-dibromo-3-nitrilepropionamide, ethyl chloroacetate, butyl chloroacetate, methyl chloroacetate, 5-chloro-2-methylisothiazolin-3-one, glutaraldehyde, and hinokitiol.

An example of the antibacterial agent is inorganic powder obtained by causing an inorganic compound to carry one or two or more kinds of antibacterial metals, such as silver, zinc, and copper. Examples of the carrier include zeolite, apatite, zirconium phosphate, titanium oxide, silica gel, aluminum sulfate hydroxide, calcium phosphate, and calcium silicate. Another example thereof is antibacterial glass powder obtained by incorporating one or two or more kinds of antibacterial metals, such as silver, zinc, and copper, into a glass using one or two or more kinds selected from phosphoric acid-, boric acid-, and silicic acid-based glasses as glass-forming components.

Examples of the lubricant may include a fatty acid, a metal salt of a fatty acid, an oxy fatty acid, paraffin, a low-molecular-weight polyolefin, a fatty acid amide, an alkylene bis-fatty acid amide, an aliphatic ketone, a partially saponified ester of a fatty acid, an ester of a fatty acid and a lower alcohol, an ester of a fatty acid and a polyhydric alcohol, an ester of a fatty acid and polyglycol, and a modified silicone.

Examples of the fatty acid include fatty acids each having 6 to 40 carbon atoms, such as oleic acid, stearic acid, lauric acid, hydroxystearic acid, behenic acid, arachidonic acid, linoleic acid, linolenic acid, palmitic acid, montanic acid, and a mixture thereof. Examples of the metal salt of a fatty acid include alkali (alkaline earth) metal salts of fatty acids each having 6 to 40 carbon atoms, such as sodium laurate, potassium laurate, magnesium laurate, calcium laurate, zinc laurate, barium laurate, sodium stearate, potassium stearate, magnesium stearate, calcium stearate, zinc stearate, bariumstearate, sodiumbehenate, potassiumbehenate, magnesiumbehenate, calciumbehenate, zincbehenate, bariumbehenate, sodium montanate, and calcium montanate.

An example of the oxy fatty acid is 1,2-oxystearic acid.

Examples of the paraffin include paraffins each having 18 or more carbon atoms, such as liquid paraffin, natural paraffin, microcrystalline wax, and petrolatum.

Examples of the low-molecular-weight polyolefin include polyolefins each having a molecular weight of 5,000 or less, such as polyethylene wax, maleic acid-modified polyethylene wax, oxide-type polyethylene wax, chlorinated polyethylene wax, and polypropylene wax. Specific examples of the fatty acid amide include fatty acid amides each having 6 or more carbon atoms, such as oleamide, erucamide, and behenamide.

Examples of the alkylene bis-fatty acid amide include alkylene bis-fatty acid amides each having 6 or more carbon atoms, such as methylene bisstearamide, ethylene bisstearamide, and N,N-bis(2-hydroxyethyl)stearamide.

Examples of the aliphatic ketone include aliphatic ketones each having 6 or more carbon atoms.

An example of the partially saponified ester of a fatty acid is a partially saponified ester of montanic acid.

Examples of the ester of a fatty acid and a lower alcohol include a stearic acid ester, an oleic acid ester, a linoleic acid ester, a linolenic acid ester, an adipic acid ester, a behenic acid ester, an arachidonic acid ester, a montanic acid ester, and an isostearic acid ester.

Examples of the ester of a fatty acid and a polyhydric alcohol include glycerol tristearate, glycerol distearate, glycerol monostearate, pentaerythritol tetrastearate, pentaerythritol tristearate, pentaerythritol dimyristate, pentaerythritol monostearate, pentaerythritol adipate stearate, and sorbitan monobehenate.

Examples of the ester of a fatty acid and polyglycol include a polyethylene glycol fatty acid ester, a polytrimethylene glycol fatty acid ester, and a polypropylene glycol fatty acid ester.

Examples of the modified silicone include polyether-modified silicone, higher fatty acid alkoxy-modified silicone, higher fatty acid-containing silicone, higher fatty acid ester-modified silicone, methacrylate-modified silicone, and fluorine-modified silicone.

C. Formed Article

The soft vinyl chloride resin composition is used in any appropriate application. As a result, the soft vinyl chloride resin composition may be formed into any appropriate shape in accordance with an application. Therefore, the present invention also includes a formed article formed from the soft vinyl chloride resin composition.

The soft vinyl chloride resin composition can be used in, for example, a film, a sheet, a packaging container (e.g., a tray), an electric wire-coating material, an interior or exterior material for an automobile, an agricultural material (e.g., a plastic greenhouse), a hose, a pipe, a wall material, a floor material, sailcloth, leather, a toy, a rubber glove, or a rubber boot. The soft vinyl chloride resin composition can be preferably used in a film or a sheet, and can be more preferably used in a sheet for food packaging or a stretch film for food packaging.

When the soft vinyl chloride resin composition is used in a food packaging application (e.g., a sheet for food packaging or a stretch film for food packaging), the liquid stabilizer in the composition is preferably free of any of an overbased carboxylate and an overbased alkaline earth metal complex from the viewpoint of safety. However, a case in which the stabilizer contains the carboxylate or the complex as an inevitable by-product may occur.

Any appropriate forming method may be adopted as a method of forming the soft vinyl chloride resin composition in accordance with, for example, the applications of the formed article and a desired shape thereof. Specific examples thereof include extrusion, injection, calendering, inflation, and dipping. Extrusion or calendering is preferred as a method of forming a film and a sheet.

When the soft vinyl chloride resin composition is used in a food packaging application (e.g., a sheet for food packaging or a stretch film for food packaging), the formed article is preferably transparent. In more detail, the haze value of the formed article is preferably 15 or less, more preferably 10 or less. The haze value is determined by a method described in Examples to be described later.

When the soft vinyl chloride resin composition is used in a food packaging application (e.g., a sheet for food packaging or a stretch film for food packaging), the formed article preferably has blocking resistance. In more detail, the peel strength of the formed article is preferably less than 35 g/30 mm, more preferably less than 20 g/30 mm. The peel strength is determined by a method described in Examples to be described later.

EXAMPLES

Now, the present invention is specifically described by way of Examples. However, the present invention is not limited by these Examples. Methods of measuring the respective characteristics are as described below.

(1) Peel Strength

Films obtained in Examples and Comparative Examples were each cut into a size measuring 100 mm long by 30 mm wide, and two films of such size were prepared. The two cut films were crimped together, and were then stored at 80° C. for 12 hours and at 20° C. for 2 hours. After that, the crimped films were peeled from each other in a room controlled to a room temperature of 20° C. with a peel strength tester (manufactured by Shinto Scientific Co., Ltd.), and a peel strength at that time was measured. The peel strength was used as an indication of blocking resistance.

(2) Transparency

The films obtained in Examples and Comparative Examples were each cut into a size measuring 50 mm long by 50 mm wide, and 50 films of such size were superimposed on one another and pressed with an electrothermal pressing machine (manufactured by Toyo Seiki Seisaku-sho, Ltd.) at 180° C. for 5 minutes to produce a test piece having a thickness of 30 mm. The haze value (turbidity) of the test piece was measured with a haze meter (manufactured by Nippon Denshoku Industries Co., Ltd.), and was used as an indication of transparency.

Example 1

0.06 Part by weight of zinc oleate (manufactured by Sakai Chemical Industry Co., Ltd.), 0.04 part by weight of zinc octylate (manufactured by Sakai Chemical Industry Co., Ltd.), 0.07 part by weight of calcium oleate (manufactured by Sakai Chemical Industry Co., Ltd.), 0.03 part by weight of calcium benzoate (manufactured by Sakai Chemical Industry Co., Ltd.), and 0.05 part by weight of polypropylene glycol (number-average molecular weight: 3,000, manufactured by Wako Pure Chemical Industries, Ltd.) were mixed. Further, 0.75 part by weight of diisononyl adipate (manufactured by J-PLUS Co., Ltd.) was added as a plasticizer-cum-solvent to the mixture, and the materials were mixed to prepare a liquid stabilizer. 30 Parts by weight of diisononyl adipate (manufactured by J-PLUS Co., Ltd., DINA) and 15 parts by weight of an epoxidized soybean oil (manufactured by Sakai Chemical Industry Co., Ltd., INBRAFLEX A-6) each serving as a plasticizer, 2 parts by weight of diglycerin oleate (manufactured by Riken Vitamin Co., Ltd., RIKEMAL O-71-D) serving as an antistatic agent, and 1.0 part by weight of the liquid stabilizer were added to 100 parts by weight of a polyvinyl chloride resin (manufactured by Shin Daiichi Enbi K. K., ZEST 1300Z), and the materials were mixed to prepare a soft vinyl chloride resin composition (Table 1-1).

The soft vinyl chloride resin composition obtained as described above was kneaded with a test roll at 180° C. for 5 minutes to be formed into a film having a thickness of 80 m. The resultant film was subjected to the above-mentioned evaluations. Its peel strength and haze value are shown in Table 1-2.

Examples 2 to 10 and Comparative Examples 1 to 16

Liquid stabilizers and soft vinyl chloride resin compositions were each prepared in the same manner as in Example 1 except that the composition ratio of the liquid stabilizer was set to a compounding ratio shown in Table 1-1, followed by the production of films. The resultant films were subjected to the same evaluations as those of Example 1. Their peel strengths and haze values are shown in Table 1-2 and Table 1-3.

TABLE 1-1

|  | Example | | | | | | | | | | Comparative Example | | | |
|---|---|---|---|---|---|---|---|---|---|---|---|---|---|---|
|  | 1 | 2 | 3 | 4 | 5 | 6 | 7 | 8 | 9 | 10 | 1 | 2 | 3 | 4 |
| Zinc oleate | 0.06 | 0.06 | 0.06 | 0.06 | 0.06 | 0.06 | 0.06 | 0.06 | 0.06 | 0.06 | 0.06 | 0.06 | 0.06 | 0.06 |
| Zinc octylate | 0.04 | 0.04 | 0.04 | 0.04 | 0.04 | 0.04 | 0.04 | 0.04 | 0.04 | 0.04 | 0.04 | 0.04 | 0.04 | 0.04 |
| Calcium oleate | 0.07 | 0.07 | 0.07 | 0.07 | 0.07 | 0.07 | 0.07 | 0.07 | 0.07 | 0.07 | 0.07 | 0.07 | 0.07 | 0.07 |
| Calcium benzoate | 0.03 | 0.03 | 0.03 | 0.03 | 0.03 | 0.03 | 0.03 | 0.03 | 0.03 | 0.03 | 0.03 | 0.03 | 0.03 | 0.03 |
| Diisononyl adipate Manufactured by J-PLUS Co., Ltd. DINA | 0.75 | 0.7 | 0.6 | 0.5 | 0.4 | 0.75 | 0.7 | 0.6 | 0.5 | 0.4 | 0.8 | 0.5 | 0.5 | 0.5 |
| Polypropylene glycol Molecular weight: 3,000 Manufactured by Wako Pure Chemical Industries, Ltd. | 0.05 | 0.1 | 0.2 | 0.3 | 0.4 |  |  |  |  |  |  |  |  |  |
| Ricinoleic acid Manufactured by Kokura Synthetic Industries, Ltd. Ricinoleic acid |  |  |  |  |  | 0.05 | 0.1 | 0.2 | 0.3 | 0.4 |  |  |  |  |

TABLE 1-1-continued

| | | | | | | | | | | | | | | |
|---|---|---|---|---|---|---|---|---|---|---|---|---|---|---|
| Polyethylene glycol Manufactured by Wako Pure Chemical Industries, Ltd. | | | | | | | | | | | 0.3 | | | |
| Oleic acid Manufactured by Kao Corporation LUNAC O-P | | | | | | | | | | | | 0.3 | | |
| Polyethylene glycol Molecular weight: 300 | | | | | | | | | | | | | 0.3 | |
| Tridecanol Manufactured by KH Neoehem Co., Ltd. | | | | | | | | | | | | | | |
| Octylic acid Manufactured by KH Neochem Co., Ltd. | | | | | | | | | | | | | | |
| Propylene glycol Manufactured by Wako Pure Chemical Industries, Ltd. | | | | | | | | | | | | | | |
| Dipropylene glycol Manufactured by Wako Pure Chemical Industries, Ltd. | | | | | | | | | | | | | | |
| Polypropylene glycol Molecular weight: 700 Manufactured by Wako Pure Chemical Industries, Ltd. | | | | | | | | | | | | | | |
| Triethylene glycol Manufactured by Mitsubishi Chemical Corporation | | | | | | | | | | | | | | |
| Oleamide Manufactured by Tokyo Chemical Industry Co., Ltd. | | | | | | | | | | | | | | |
| Octanol Manufactured by KH Neochem Co., Ltd. | | | | | | | | | | | | | | |
| Sorbitan oleate Manufactured by Toho Chemical Industry Co., Ltd. SORBON S-80 | | | | | | | | | | | | | | |
| Polyoxyethylene sorbitan oleate Manufactured by Toho Chemical Industry Co., Ltd. | | | | | | | | | | | | | | |
| Silica Manufactured by Evonik Degussa Japan Co., Ltd. | | | | | | | | | | | | | | |
| Ethylene bisamide Manufactured by Kao Corporation KAO WAX EB-FF | | | | | | | | | | | | | | |
| Total | 1.0 | 1.0 | 1.0 | 1.0 | 1.0 | 1.0 | 1.0 | 1.0 | 1.0 | 1.0 | 1.0 | 1.0 | 1.0 | 1.0 |

TABLE 1-1-continued

| | Comparative Example | | | | | | | | | | | |
|---|---|---|---|---|---|---|---|---|---|---|---|---|
| | 5 | 6 | 7 | 8 | 9 | 10 | 11 | 12 | 13 | 14 | 15 | 16 |
| Zinc oleate | 0.06 | 0.06 | 0.06 | 0.06 | 0.06 | 0.06 | 0.06 | 0.06 | 0.06 | 0.06 | 0.06 | 0.06 |
| Zinc octylate | 0.04 | 0.04 | 0.04 | 0.04 | 0.04 | 0.04 | 0.04 | 0.04 | 0.04 | 0.04 | 0.04 | 0.04 |
| Calcium oleate | 0.07 | 0.07 | 0.07 | 0.07 | 0.07 | 0.07 | 0.07 | 0.07 | 0.07 | 0.07 | 0.07 | 0.07 |
| Calcium benzoate | 0.03 | 0.03 | 0.03 | 0.03 | 0.03 | 0.03 | 0.03 | 0.03 | 0.03 | 0.03 | 0.03 | 0.03 |
| Diisononyl adipate Manufactured by J-PLUS Co., Ltd. DINA | 0.5 | 0.5 | 0.5 | 0.5 | 0.5 | 0.5 | 0.5 | 0.5 | 0.5 | 0.5 | 0.5 | 0.5 |
| Polypropylene glycol Molecular weight: 3,000 Manufactured by Wako Pure Chemical Industries, Ltd. | | | | | | | | | | | | |
| Ricinoleic acid Manufactured by Kokura Synthetic Industries, Ltd. | | | | | | | | | | | | |
| Ricinoleic acid Polyethylene glycol Manufactured by Wako Pure Chemical Industries, Ltd. | | | | | | | | | | | | |
| Oleic acid Manufactured by Kao Corporation LUNAC O-P | | | | | | | | | | | | |
| Polyethylene glycol Molecular weight: 300 | | | | | | | | | | | | |
| Tridecanol Manufactured by KH Neoehem Co., Ltd. | 0.3 | | | | | | | | | | | |
| Octylic acid Manufactured by KH Neochem Co., Ltd. | | 0.3 | | | | | | | | | | |
| Propylene glycol Manufactured by Wako Pure Chemical Industries, Ltd. | | | 0.3 | | | | | | | | | |
| Dipropylene glycol Manufactured by Wako Pure Chemical Industries, Ltd. | | | | 0.3 | | | | | | | | |
| Polypropylene glycol Molecular weight: 700 Manufactured by Wako Pure Chemical Industries, Ltd. | | | | | 0.3 | | | | | | | |
| Triethylene glycol Manufactured by Mitsubishi Chemical Corporation | | | | | | 0.3 | | | | | | |
| Oleamide Manufactured by Tokyo Chemical Industry Co., Ltd. | | | | | | | 0.3 | | | | | |

TABLE 1-1-continued

| | | | | | | | | | | | | |
|---|---|---|---|---|---|---|---|---|---|---|---|---|
| Octanol Manufactured by KH Neochem Co., Ltd. | | | | | | 0.3 | | | | | | |
| Sorbitan oleate Manufactured by Toho Chemical Industry Co., Ltd. SORBON S-80 | | | | | | | 0.3 | | | | | |
| Polyoxyethylene sorbitan oleate Manufactured by Toho Chemical Industry Co., Ltd. | | | | | | | | 0.3 | | | | |
| Silica Manufactured by Evonik Degussa Japan Co., Ltd. | | | | | | | | | | 0.1 | | |
| Ethylene bisamide Manufactured by Kao Corporation KAO WAX EB-FF | | | | | | | | | | | | 0.4 |
| Total | 1.0 | 1.0 | 1.0 | 1.0 | 1.0 | 1.0 | 1.0 | 1.0 | 1.0 | 1.0 | 0.8 | 1.1 |

TABLE 1-2

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Haze value % | 5.8 | 6 | 6.3 | 6.3 | 6.4 | 5.6 | 6.5 | 7.1 | 7.4 | 7.8 |
| Peel strength g/30 mm | 30.3 | 22.7 | 22.3 | 16.3 | 14 | 26.3 | 21.3 | 18.7 | 16 | 14.3 |

TABLE 1-3

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Haze value % | 5.4 | 5.3 | 5.8 | 6 | 6 | 5.8 | 7.2 | 6.6 | 5.3 |
| Peel strength g/30 mm | 44.7 | 44 | 44.9 | 50 | 49 | 39 | 39 | 49 | 42 |

| | Comparative Example 10 | Comparative Example 11 | Comparative Example 12 | Comparative Example 13 | Comparative Example 14 | Comparative Example 15 | Comparative Example 16 |
|---|---|---|---|---|---|---|---|
| Haze value % | 6.1 | 6.3 | 6.6 | 13 | 12 | 15.1 | 73 |
| Peel strength g/30 mm | 47 | 40 | 43 | 38 | 45 | 21 | 26 |

Example 11

0.15 Part by weight of zinc octylate (manufactured by Sakai Chemical Industry Co., Ltd.), 0.1 part by weight of barium oleate (manufactured by Sakai Chemical Industry Co., Ltd.), 0.05 part by weight of barium para-t-butylbenzoate (manufactured by Sakai Chemical Industry Co., Ltd.), and 0.2 part by weight of polypropylene glycol (number-average molecular weight: 3,000, manufactured by Wako Pure Chemical Industries, Ltd.) were mixed. Further, 1.0 part by weight of dioctyl phthalate (manufactured by J-PLUS Co., Ltd., DOP) was added as a plasticizer-cum-solvent to the mixture, and the materials were mixed to prepare a liquid stabilizer. 50 Parts by weight of dioctyl phthalate (manufactured by J-PLUS Co., Ltd., DOP) and 3 parts by weight of an epoxidized soybean oil (manufactured by Sakai Chemical Industry Co., Ltd., INBRAFLEX A-6) each serving as a plasticizer, and 1.5 parts by weight of the liquid stabilizer were added to 100 parts by weight of a polyvinyl chloride resin (manufactured by Shin Daiichi Enbi K. K., ZEST 1000Z), and the materials were mixed to prepare a soft vinyl chloride resin composition (Table 2-1). A film was formed in the same manner as in Example 1 by using the resultant soft vinyl chloride resin composition. The resultant film was subjected to the same evaluations as those of Example 1. Its peel strength and haze value are shown in Table 2-2.

Examples 12 to 16 and Comparative Examples 17 to 21

Liquid stabilizers and soft vinyl chloride resin compositions were each prepared in the same manner as in Example 11 except that the composition ratio of the liquid stabilizer was set to a compounding ratio shown in Table 2-1, followed by the production of films. The resultant films were subjected to the same evaluations as those of Example 1. Their peel strengths and haze values are shown in Table 2-2.

soft vinyl chloride resin composition of the present invention can be used in, for example, a film, a sheet, a packaging container (e.g., a tray), an electric wire-coating material, an interior or exterior material for an automobile, an agricultural material (e.g., a plastic greenhouse), a hose, a pipe, a wall material, a floor material, sailcloth, leather, a toy, a rubber glove, or a rubber boot, and can be particularly suitably used in a sheet for food packaging or a stretch film for food packaging.

TABLE 2-1

|  | Example | | | | | | Comparative Example | | | | |
| --- | --- | --- | --- | --- | --- | --- | --- | --- | --- | --- | --- |
|  | 11 | 12 | 13 | 14 | 15 | 16 | 17 | 18 | 19 | 20 | 21 |
| Zinc octylate | 0.15 | 0.15 | 0.15 | 0.15 | 0.15 | 0.15 | 0.15 | 0.15 | 0.15 | 0.15 | 0.15 |
| Barium oleate | 0.1 | 0.1 | 0.1 | 0.1 | 0.1 | 0.1 | 0.1 | 0.1 | 0.1 | 0.1 | 0.1 |
| Barium para-t-butylbenzoate | 0.05 | 0.05 | 0.05 | 0.05 | 0.05 | 0.05 | 0.05 | 0.05 | 0.05 | 0.05 | 0.05 |
| Dioctyl phthalate Manufactured by J-PLUS Co., Ltd. | 1 | 0.9 | 0.8 | 1 | 0.9 | 0.8 | 1.2 | 0.9 | 0.9 | 0.9 | 0.9 |
| Polypropylene glycol Molecular weight: 3,000 Manufactured by Wako Pure Chemical Industries, Ltd. | 0.2 | 0.3 | 0.4 |  |  |  |  |  |  |  |  |
| Ricinoleic acid Manufactured by Kokura Synthetic Industries, Ltd. |  |  |  | 0.2 | 0.3 | 0.4 |  |  |  |  |  |
| Ricinoleic acid |  |  |  |  |  |  |  |  |  |  | 0.3 |
| Polyethylene glycol Molecular weight: 300 Manufactured by Wako Pure Chemical Industries, Ltd. |  |  |  |  |  |  | 0.3 |  |  |  |  |
| Oleic acid Manufactured by Kao Corporation LUNAC O-P |  |  |  |  |  |  |  | 0.3 |  |  |  |
| Silica Manufactured by Evonik Degussa Japan Co., Ltd. CARPLEX 80-D |  |  |  |  |  |  |  |  | 0.3 |  |  |
| Ethylene bisamide Manufactured by Kao Corporation KAO WAX EB-FF |  |  |  |  |  |  |  |  |  | 0.3 |  |
| Total | 1.5 | 1.5 | 1.5 | 1.5 | 1.5 | 1.5 | 1.5 | 1.5 | 1.5 | 1.5 | 1.5 |

TABLE 2-2

|  | Example 11 | Example 12 | Example 13 | Example 14 | Example 15 | Example 16 | Comparative Example 17 | Comparative Example 18 | Comparative Example 19 | Comparative Example 20 | Comparative Example 21 |
| --- | --- | --- | --- | --- | --- | --- | --- | --- | --- | --- | --- |
| Haze value % | 4.8 | 4.8 | 4.6 | 6.2 | 6.8 | 7.1 | 4.4 | 4.8 | 5.1 | 13.8 | 63.2 |
| Peel strength g/30 mm | 320 | 295 | 280 | 330 | 296 | 288 | 360 | 355 | 363 | 275 | 330 |

Evaluation

As is apparent from Table 1 and Table 2, the films formed from the compositions of Examples of the present invention are significantly reduced in peel strength as compared to Comparative Examples, and are hence excellent in blocking resistance.

INDUSTRIAL APPLICABILITY

The liquid stabilizer of the present invention can be suitably used in a soft vinyl chloride resin composition. The

The invention claimed is:

1. A liquid stabilizer for a vinyl chloride resin, comprising:
   an organic acid zinc salt;
   an alkaline earth metal salt of an organic acid; and
   ricinoleic acid, or ricinoleic acid and polypropylene glycol having a number-average molecular weight of 2,000 or more,
   wherein the ricinoleic acid is not present as the organic acid forming the zinc salt or the alkaline earth metal salt.

2. The liquid stabilizer for a vinyl chloride resin according to claim 1, wherein the liquid stabilizer comprises two or more of the organic acid zinc salts.

3. The liquid stabilizer for a vinyl chloride resin according to claim 1, wherein the liquid stabilizer comprises two or more of the alkaline earth metal salts of the organic acid.

4. The liquid stabilizer for a vinyl chloride resin according to claim 1, wherein the organic acid is selected from oleic acid, octylic acid, and benzoic acid.

5. The liquid stabilizer for a vinyl chloride resin according to claim 1, wherein the alkaline earth metal is selected from calcium and barium.

6. A vinyl chloride resin composition, comprising, with respect to 100 parts by weight of a vinyl chloride resin:
   0.1 part by weight to 5 parts by weight of the liquid stabilizer of claim 1; and
   20 parts by weight to 100 parts by weight of a plasticizer.

7. The vinyl chloride resin composition according to claim 6, wherein the plasticizer is selected from an alkyl adipate, an epoxidized soybean oil, and a phthalate.

8. A formed article, which is formed from the vinyl chloride resin composition of claim 6.

9. The formed article according to claim 8, wherein the formed article comprises a film or a sheet.

10. The formed article according to claim 9, wherein the formed article is for use in food packaging.

11. The liquid stabilizer for a vinyl chloride resin according to claim 2, wherein the liquid stabilizer comprises two or more of the alkaline earth metal salts of the organic acid.

12. The liquid stabilizer for a vinyl chloride resin according to claim 2, wherein the organic acid is selected from oleic acid, octylic acid, and benzoic acid.

13. The liquid stabilizer for a vinyl chloride resin according to claim 3, wherein the organic acid is selected from oleic acid, octylic acid, and benzoic acid.

14. The liquid stabilizer for a vinyl chloride resin according to claim 11, wherein the organic acid is selected from oleic acid, octylic acid, and benzoic acid.

15. The liquid stabilizer for a vinyl chloride resin according to claim 2, wherein the alkaline earth metal is selected from calcium and barium.

16. The liquid stabilizer for a vinyl chloride resin according to claim 3, wherein the alkaline earth metal is selected from calcium and barium.

17. The liquid stabilizer for a vinyl chloride resin according to claim 4, wherein the alkaline earth metal is selected from calcium and barium.

18. The liquid stabilizer for a vinyl chloride resin according to claim 14, wherein the alkaline earth metal is selected from calcium and barium.

19. A vinyl chloride resin composition, comprising, with respect to 100 parts by weight of a vinyl chloride resin:
   0.1 part by weight to 5 parts by weight of the liquid stabilizer of claim 18; and
   20 parts by weight to 100 parts by weight of a plasticizer.

20. The liquid stabilizer for a vinyl chloride resin according to claim 1, wherein a content of the organic acid zinc salt in the liquid stabilizer is from 5 wt % to 40 wt % with respect to a total amount of the liquid stabilizer.

21. The liquid stabilizer for a vinyl chloride resin according to claim 1, wherein a content of the alkaline earth metal salt of the organic acid in the liquid stabilizer is from 5 wt % to 70 wt % with respect to a total amount of the liquid stabilizer.

22. The liquid stabilizer for a vinyl chloride resin according to claim 1, wherein a content of ricinoleic acid in the liquid stabilizer is from 3 wt % to 40 wt % with respect to a total amount of the liquid stabilizer.

* * * * *